US008073514B2

(12) United States Patent
Black et al.

(10) Patent No.: US 8,073,514 B2
(45) Date of Patent: Dec. 6, 2011

(54) ELECTRONIC DEVICE HAVING A DUAL AUTODIPLEXING ANTENNA

(75) Inventors: Greg R. Black, Vernon Hills, IL (US); Vijay L. Asrani, Round Lake, IL (US); Adrian Napoles, Lake Villa, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 588 days.

(21) Appl. No.: 12/144,455

(22) Filed: Jun. 23, 2008

(65) Prior Publication Data

US 2008/0268926 A1 Oct. 30, 2008

Related U.S. Application Data

(62) Division of application No. 11/428,027, filed on Jun. 30, 2006, now Pat. No. 7,724,194.

(51) Int. Cl.
*H04M 1/00* (2006.01)

(52) U.S. Cl. ..................... 455/575.7; 370/297; 343/702; 343/753; 324/639; 438/29

(58) Field of Classification Search ............... 455/575.7; 370/297; 343/702, 753; 324/639; 438/29
See application file for complete search history.

(56) References Cited

U.S. PATENT DOCUMENTS

| | | | | |
|---|---|---|---|---|
| 5,486,836 | A | 1/1996 | Kuffner et al. | |
| 6,362,793 | B1 | 3/2002 | Sawamura et al. | |
| 7,724,194 | B2 * | 5/2010 | Black et al. | 343/702 |
| 2001/0017602 | A1 | 8/2001 | Hieb | |
| 2003/0048227 | A1 | 3/2003 | Nakamura | |
| 2003/0228891 | A1 | 12/2003 | Kobayashi et al. | |
| 2005/0085204 | A1 | 4/2005 | Poilasne et al. | |
| 2007/0216584 | A1 | 9/2007 | Nishikido et al. | |
| 2009/0295646 | A1 * | 12/2009 | Oh et al. | 343/702 |
| 2009/0295660 | A1 * | 12/2009 | Xu et al. | 343/753 |
| 2009/0322349 | A1 * | 12/2009 | Hancock et al. | 324/639 |
| 2010/0033395 | A1 * | 2/2010 | Ding et al. | 343/834 |
| 2010/0035370 | A1 * | 2/2010 | Ding et al. | 438/29 |
| 2010/0109971 | A2 * | 5/2010 | Gummalla et al. | 343/909 |
| 2010/0117908 | A2 * | 5/2010 | Lee et al. | 343/700 MS |
| 2010/0157858 | A1 * | 6/2010 | Lee et al. | 370/297 |

OTHER PUBLICATIONS

Duong, Dieu H., "Non-Final Office Action", Divisional U.S. Appl. No. 12/144,477, mailed Jul. 9, 2009.

Duong, Dieu H., "Final Office Action", U.S. Appl. No. 12/144,477, filed Jun. 23, 2008, Greg Black inventor, Mailed Feb. 2, 2010.

* cited by examiner

*Primary Examiner* — William D Cumming

(57) ABSTRACT

A dual autodiplexing antenna (300) redirects power flow (303) from an unloaded antenna to a loaded antenna, thereby improving communication performance under loaded conditions. The dual autodiplexing antenna (300) includes a first antenna (101) disposed at a first end (103) of a portable two-way communication device (100). A second antenna (102) is disposed at the distal end (104) of the portable two-way communication device (100). The first antenna (101) and second antenna (102) are coupled to a transceiver (107) by a first transmission line matching circuit (201) and a second transmission line matching circuit (202), respectively. In one embodiment, the first antenna (101) is configured to primarily operate in a first bandwidth, while the second antenna (102) is configured to primarily operate in a second bandwidth. When one of the first antenna (101) or second antenna (102) is loaded, power flow (303) is redirected to the lesser loaded antenna.

6 Claims, 10 Drawing Sheets

ELECTRONIC DEVICE HAVING A DUAL AUTODIPLEXING ANTENNA

CROSS REFERENCE TO PRIOR APPLICATIONS

This application claims is a divisional application from, and claims priority under 35 U.S.C. §121 from, U.S. application Ser. No. 11/428,027, filed Jun. 30, 2006.

BACKGROUND

1. Technical Field

This invention relates generally to electronic devices having antennas for transmission of communication signals, and more specifically to an electronic device having dual antennas, wherein the dual antennas are autodiplexing in that they direct power to a lesser loaded of the antennas.

2. Background Art

Two-way communication devices, such as mobile telephones, two-way radios, and personal digital assistants, each use antennas to transmit and receive radio-frequency communication signals. These antennas communicate with wide area network towers, local area network base stations, and even other devices directly, to transmit and receive data. The antennas allow the device to be truly wireless, in that all communication may occur through the air.

While once large, retractable devices, the antennas found on most common communication devices are quite small today. The antennas generally come in one of two forms: stub and internal. With a stub antenna, a small protrusion emanates from the electronic device. With the internal antenna, the antenna itself is completely embedded within the device, thereby creating a sleeker, stylish look.

One problem experienced by both stub and internal antennas is that of loading. Using a mobile telephone as an example, when a person places a call, they generally hold the phone close to their ear with a hand. As today's mobile telephones are becoming quite small, sometimes the hand effectively envelops the device. Consequently, the antenna within the device must transmit power either through or around the hand to communicate with a tower, base station, or other device. The hand being placed next to the antenna "loads" the antenna, thereby making it more difficult for the antenna to "talk" to other devices.

There are two prior art solutions to the loading problem. The first solution is to simply make the antenna bigger. For example, in prior art two-way radios, the antenna was a long, extendable metal device. Where the antenna extends beyond whatever is loading it, the loading effect is reduced. This solution is not feasible in today's modern electronic devices, however, as a two-foot antenna is not practical on a three-inch mobile telephone. Further, high operating frequencies may not be suitable for an antenna that is very long compared with its operating wavelength.

The second prior art solution is to increase the transmission power whenever the antenna is loaded. The problem with this solution is that rechargeable batteries generally power these mobile devices. As such, an increase in transmission power means an increased load on the battery. This increased load means less "talk-time" between recharging, which can be frustrating to users of these devices.

There is thus a need for an improved antenna for electronic communication devices capable of operation under loaded conditions.

Figure 1:
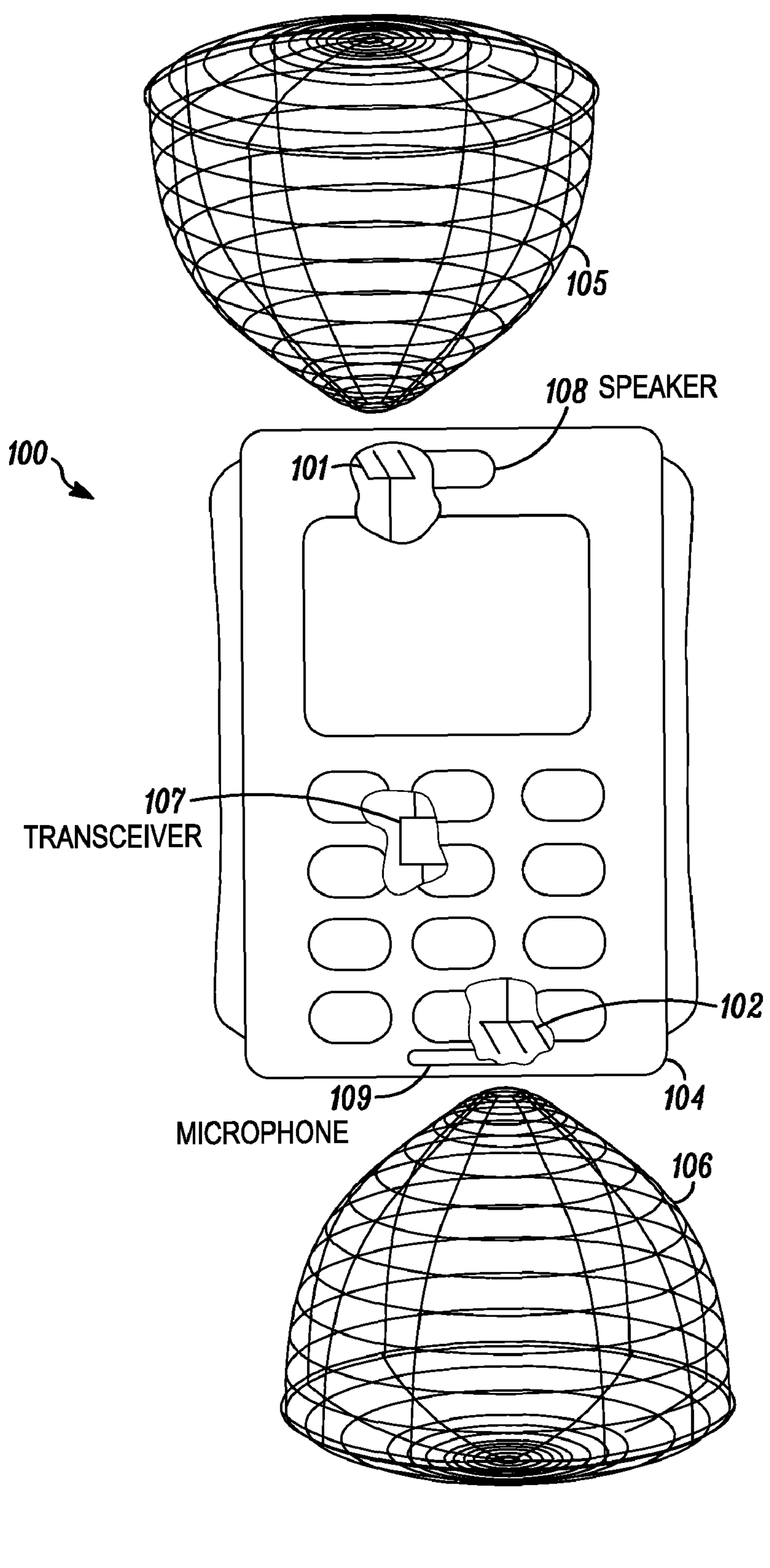
FIG. 1 illustrates one embodiment of a portable two-way communication device having a dual antenna in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of apparatus components related to an electronic device having a dual autodiplexing antenna. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

As noted above, loading of antennas in portable communication devices, such as mobile telephones, may cause performance degradation. The increased load on the antenna makes it more difficult for the antenna to effectively communicate with a remote source. The difficulty in communication may result in dropped calls, intermittent audio, or worse. As many mobile telephone operating frequencies, including those associated with the Global Standard for Mobile Communications (GSM), operate at high frequencies, the antenna structures are becoming smaller. Consequently, hand-loading effects are more severe in these types of devices.

As will be illustrated and described herein, in one embodiment, the invention includes a two-way communication device having a first antenna located in the bottom of the device, while a second antenna is located in the top. The antennas, each comprising radiating elements, are primarily designed to operate in two different frequency bands, with the top antenna operating in a first band, and the bottom antenna operating in a second band. Using GSM protocols as an example, the bottom antenna may be designed for low-band GSM communications, e.g. 880-960 MHz, while the top antenna is designed for high band operation, e.g. 1710-1880 MHz. In another embodiment the low-band GSM range may be between about 824 MHz and 894 MHz, while the high band may be between about 1850 MHz and 1990 MHz. These bands are exemplary, as other bands may be used depending upon the application.

A transceiver drives the two antennas via two passive transmission line matching circuits. The bottom antenna, while primarily designed to operate in the low band, is also capable of operation in the high band, thereby providing a first part of the autodiplexing functionality. Each antenna has a nominal impedance and various loaded impedances. A loaded impedance may occur, for example, when the communication device is placed against the ear, with the users hand generally across the back of the device. Experimental testing has shown that one embodiment of a "worst case" load occurs when the communication device is placed against the ear, with the users hand at specific locations, relative to the antenna, on back of the device. In the case of a phone, the user's forefinger may press the earpiece against the ear, while the thumb and other fingers grasp the phone on the sides.

At the nominal impedance, each of the antennas receives a portion of the transmission signal from the transceiver. When one of the antennas is loaded, perhaps by a user's hand, the antenna/transmission line combination becomes mismatched, thereby causing less of the signal to be routed to the loaded antenna. As in one embodiment the user loads the top antenna by pressing the earpiece to the ear while pressing at specific locations on the back of the device, this results in power being "passively" directed to the lower, lesser-loaded antenna, which is capable of operation in both bands. This results in improved transmission performance over prior art antennas. The term "passively" is used because there are no active components directing the flow of power—it is passively directed through impedance mismatches.

Each transmission line matching circuit coupling the transceiver with the antennas includes an associated insertion phase. In one embodiment, the insertion phase is selected and designed to maximize the real part, and minimize the reactive part, of the impedance at the transmission line input when the corresponding antenna is at a worst case impedance. In such a situation, the effective impedance of the antenna goes high relative to the system, and the share of power received by that antenna from the transceiver becomes reduced. Thus, the transmission power is directed to the other antenna.

In one embodiment, the insertion phase is selected and designed to increase the input impedance of the antenna when the antenna radiating element is loaded in a worst case condition. The insertion phase may be selected to maximize the input impedance of the antenna when the corresponding radiating element is loaded. Under mismatch, the transmission line/antenna assembly acts as a diplexor, steering power away from the mismatched antenna. Embodiments of the invention are suitable for use with all types of antennas, including F-structure antennas, inverted F-structure antennas, inverted C-structure antennas, patch antennas, body radiator antennas, and other types of antennas.

Turning now to FIG. 1, illustrated therein is one embodiment of a portable two-way communication device 100 having dual autodiplexing antennas in accordance with the invention. The portable two-way communication device 100 includes a first antenna 101 configured for operation in at least a first bandwidth. The first antenna 101 is disposed at a first end 103 of the portable two-way communication device 100. Where the portable two-way communication device 100 is a mobile telephone, the portable two-way communication device 100 may include a speaker 108 and microphone 109. In such a device, the first antenna 101 may be vicinal with the speaker 108.

The portable two-way communication device 100 also includes a second antenna 102 configured for operation in at least a second bandwidth. The second antenna 102 is disposed at a distal end 104 of the portable two-way communication device 100. Where the portable two-way communication device 100 is a mobile telephone, the second antenna 102 may be vicinal with the microphone 109. In one embodiment, both the first antenna 101 and the second antenna 102 are disposed at the rear of the portable two-way communication device 100, such that transmission has directivity primarily out of the rear of the portable two-way communication device 100.

Note that while for discussion purposes a mobile telephone will be used herein as an exemplary device, it will be clear to those of ordinary skill in the art having the benefit of this disclosure that the invention is not so limited. The dual autodiplexing antenna structure could equally be applied to any type of device employing antennas as a communication means. Such devices may include two-way radios, pagers, gaming devices, personal computers, and the like.

A transceiver 107 is electrically coupled to both the first antenna 101 and the second antenna 102. The transceiver 107, which may be one of a transmitter or receiver or a combined transceiver, generates and amplifies communication signals for delivery to the first antenna 101 and second antenna 102. The transceiver 107 may include associated amplification and power management circuitry as well.

Each of the first antenna 101 and second antenna 102 has a radiation pattern 105,106 associated therewith. The radiation pattern 105,106 is indicative of an antenna's effectiveness at transmitting and receiving communication signals at certain frequencies. These radiation patterns 105,106 will change with loading. They are presented here simply to provide a mnemonic device indicative of an antenna's effectiveness, as more technical indicia—including return loss and Smith charts—will be used below.

Figure 2:
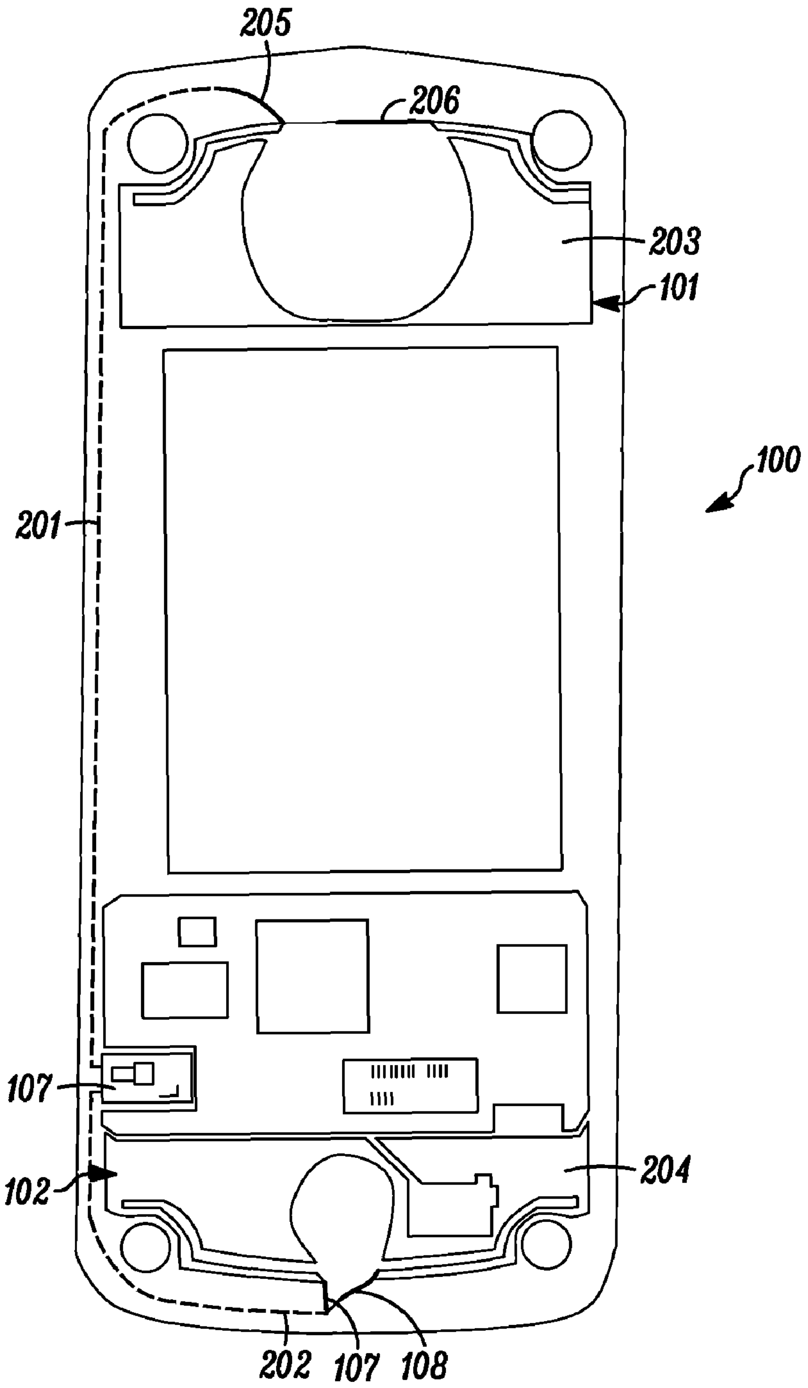
FIG. 2 illustrates a cut-away view of one embodiment of a portable two-way communication device having a dual antenna in accordance with the invention.

Turning now to FIG. 2, illustrated therein is a cut-away view of one embodiment of a portable two-way communication device 100 having a dual autodiplexing antenna in accordance with the invention. From this cut-away view, internal components may be more readily seen.

As mentioned above, the portable two-way communication device 100 includes both a first antenna 101 and second antenna 102. The first antenna 101 includes a first radiating element 203, and the second antenna 102 includes a second radiating element 204. The first antenna 101 has a signal feed 205 and ground feed 206. Similarly, the second antenna 102 has a signal feed 207 and a ground feed 208. These antennas, shown herein as internal FICA antennas, are cut pieces of conductive metal—such as copper—capable of radiating or receiving electromagnetic energy. Other antenna structures, such as PIFA structures, may also be used in accordance with embodiments of the invention. As will be described in FIGS. 3, 6, and 8, each of the first antenna 101 and second antenna 102 has associated therewith a nominal impedance and at least one loaded impedance. The nominal impedance may be a free-space impedance, while the loaded impedance may occur when a lossy object is placed near one of the antennas.

Each of the first antenna 101 and second antenna 102 is driven by a transceiver 107. The transceiver 107 is coupled to the first antenna 101 and second antenna 102 by transmission line matching circuits. Specifically, a first transmission line matching circuit 201 couples the signal feed 205 to the first antenna 101 with the transceiver 107, while a second transmission line matching circuit 202 couples the signal feed 207 to the second antenna 102 with the transceiver 107. In one embodiment, each transmission line matching circuit is comprised of copper, coplanar waveguides. These waveguides are made of copper traces on each side of a printed circuit board. Where the printed circuit board is disposed within a portable electronic device, the printed circuit board may also include other electronic components, such as keypad and display circuits.

By way of example, a top trace may include a zig-zagging copper path of roughly 12 mil thickness moving between a 51 mil copper, grounded border, with a spacing of between 3 and 4 mills between the path and the border. The copper path and border collectively comprise a coplanar waveguide. On the opposite side of the printed circuit board, a solid 51 mil trace may pass beneath the border. While the lengths of the transmission line matching circuits are somewhat device dependent, in one embodiment the optimal length of the first transmission line matching circuit 201 is the length that increases or maximizes a real part and decreases or minimizes a reactive part of the low band impedance at the input of the first transmission line matching circuit 201 and first antenna 101 when the second transmission line matching circuit 202 is disconnected, where the increasing or maximizing applies to the loaded impedance relative to the unloaded impedance of antenna 101. Similarly, in one embodiment the optimal length of the second transmission line matching circuit 202 is the length that increases or maximizes the real part and decreases or minimizes the reactive part of the high band impedance at the input of the second transmission line matching circuit 202 input and second antenna 102 when the first transmission line matching circuit 201 is disconnected, where the increasing or maximizing applies to the loaded impedance relative to the unloaded impedance of antenna 102. Note that the transmission line matching circuits may employ transmission lines of the appropriate length to provide an insertion phase for increasing the real part of the loaded impedance relative to the unloaded impedance. Other circuits, including low-pass, high-pass, band-pass, or all-pass networks, or a combination thereof, may also be used to provide the necessary insertion phase. Thus, other transmission line matching circuits for use with other antenna types may also be designed with these guidelines and the other parameters set forth in the discussion below.

Figure 3:
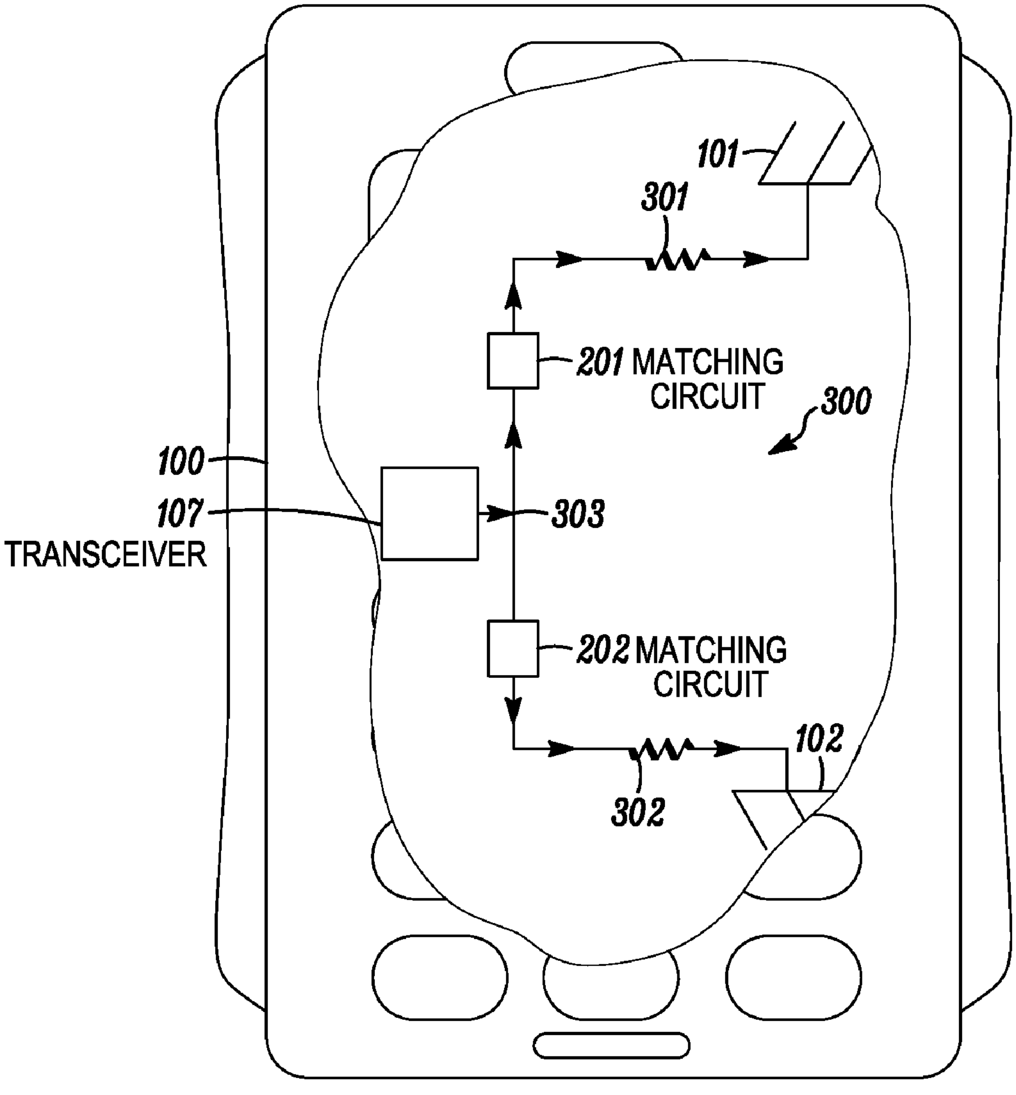
FIG. 3 provides a schematic representation of one embodiment of a portable two-way communication device having unloaded dual antennas in accordance with the invention.

Turning now to FIG. 3, illustrated therein is a schematic diagram representing the first antenna 101, second antenna 102, and transceiver 107 of a dual autodiplexing antenna 300 in accordance with one embodiment of the invention. As noted above, each of the first antenna 101 and second antenna 102 has associated therewith a nominal impedance in an unloaded state and at least a second, loaded impedance in a loaded state. In FIG. 3, first impedance 301 and second impedance 302 illustrate the nominal impedance of the first antenna 101 and second antenna 102, respectively. The impedances are nominal as the portable two-way communication device 100 is in free space, with neither antenna loaded.

The first antenna 101 is coupled to the transceiver 107 with the first transmission line matching circuit 201. The first transmission line matching circuit 201 has a first insertion phase associated therewith. The second antenna 102 is coupled to the transceiver 107 with the second transmission line matching circuit 202, which has a second insertion phase associated therewith. The first insertion phase is selected to increase or substantially maximize an input impedance of the first antenna 101 when the radiating element of the first antenna 101 is loaded. Likewise, the second insertion phase is selected to increase or substantially maximize an input impedance of the second antenna 102 with the radiating element of the second antenna 102 is loaded. The term "substantially" is used because it will be clear to those of ordinary skill in the art having the benefit of this disclosure that absolute maximization need not be achieved for the power redirection to be optimal. Substantial maximization, within tolerances or a window about the maximum will work suitably.

In one embodiment, the first insertion phase is greater than the second insertion phase. Such an embodiment may be in a GSM application where the first antenna 101 is designed for high band transmission and the second antenna 102 is designed for low band transmission. Experimental testing has shown that an insertion phase of greater than 50 degrees at 1 GHz for the first transmission line matching circuit 201, and an insertion phase of less than 50 degrees at 1 GHZ for the second transmission line matching circuit 202 is suitable for applications. Simulations for such applications include an insertion phase of 75 degrees at 1 GHz for the first transmission line matching circuit 201, and an insertion phase of 20 degrees at 1 GHz for the second transmission line matching circuit 202. Power flow 303 in the unloaded state is generally directed to both the first antenna 101 and second antenna 102, although at a given frequency of operation power may flow mostly to a single antenna.

Figure 4B:
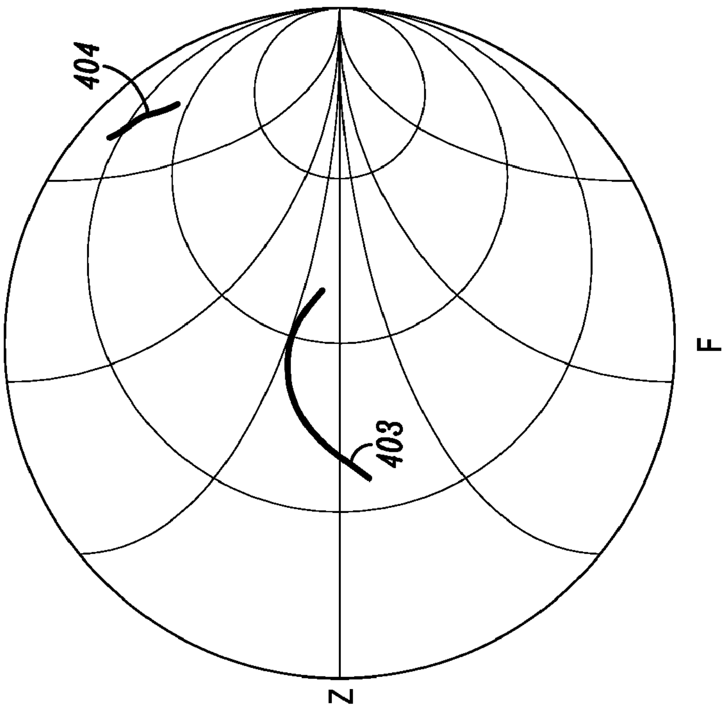
FIGS. 4 and 5 illustrate exemplary return loss and complex impedance plots for a first antenna and second antenna, each unloaded, in accordance with one embodiment of the invention.
Figure 4A:
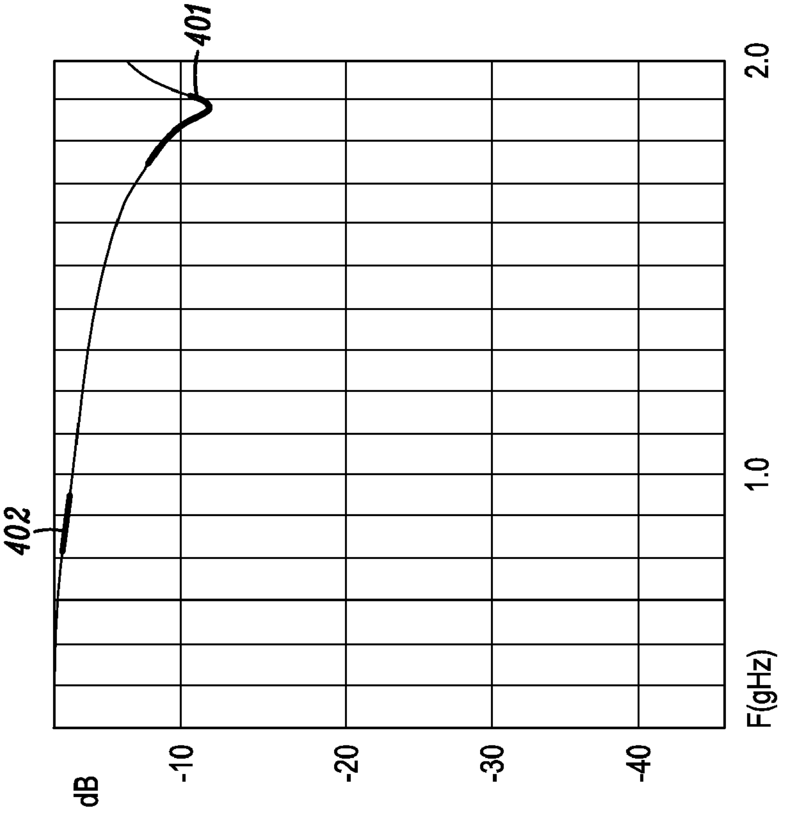
Figure 5B:
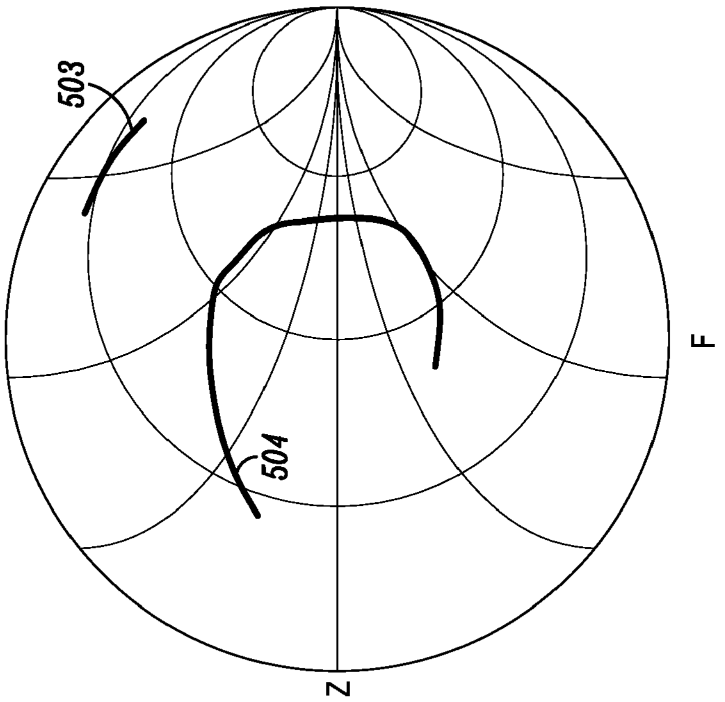
Figure 5A:
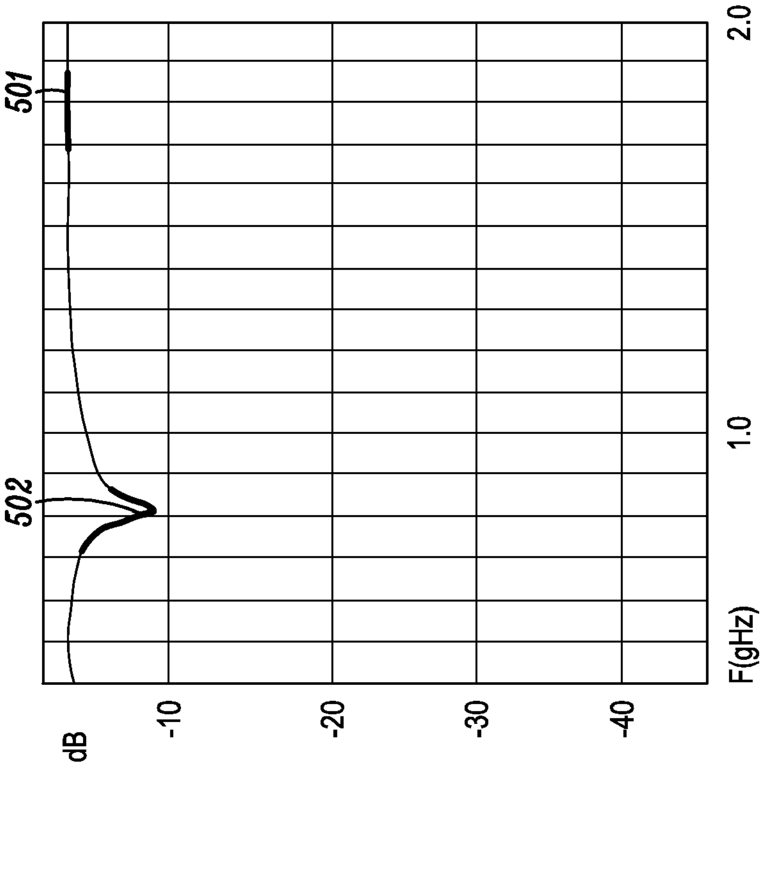

Turning now to FIGS. 4 and 5, illustrated therein is the nominal return loss and complex impedance for the first antenna (101) and second antenna (102), respectively. FIG. 4 illustrates the high band nominal return loss and complex impedance for the first antenna (101), while FIG. 5 illustrates the low band nominal return loss and complex impedance for the second antenna (102).

In FIG. 4, highlighted portion 401 illustrates the return loss of the first antenna (101) in the high band, while highlighted portion 402 illustrates the return loss of the first antenna (101) in the low band. Note that this is using the exemplary bands of 1710-1880 MHz and 880-960 MHz in a GSM application as the high and low bands. It will be clear to those of ordinary skill in the art having the benefit of this disclosure that the invention is not so limited. Other dual band schemes, including those suitable for other spread spectrum communication protocols such as CDMA, may be used to define high and low bands.

From viewing the return loss at highlighted section 401, it may be seen that the first antenna (101) is primarily characterized for operation in the high band, since its return loss is better than that in the low band. The highlighted region 403 illustrates, via conventional Smith chart representation, the nominal complex impedance of the first antenna (101) in the high band, while highlighted region 404 illustrates the nominal complex impedance of the first antenna (101) in the low band.

In FIG. 5, highlighted portion 501 illustrates the return loss of the second antenna (102) in the high band, while highlighted portion 502 illustrates the return loss of the second antenna (102) in the low band. From viewing the return loss at highlighted section 501, it may be seen that the second antenna (102) is primarily characterized for operation in the low band, since its return loss is better than that in the high band. The highlighted region 503 illustrates the nominal complex impedance of the second antenna (102) in the high band, while highlighted region 504 illustrates the nominal complex impedance of the second antenna (102) in the low band.

Figure 6:
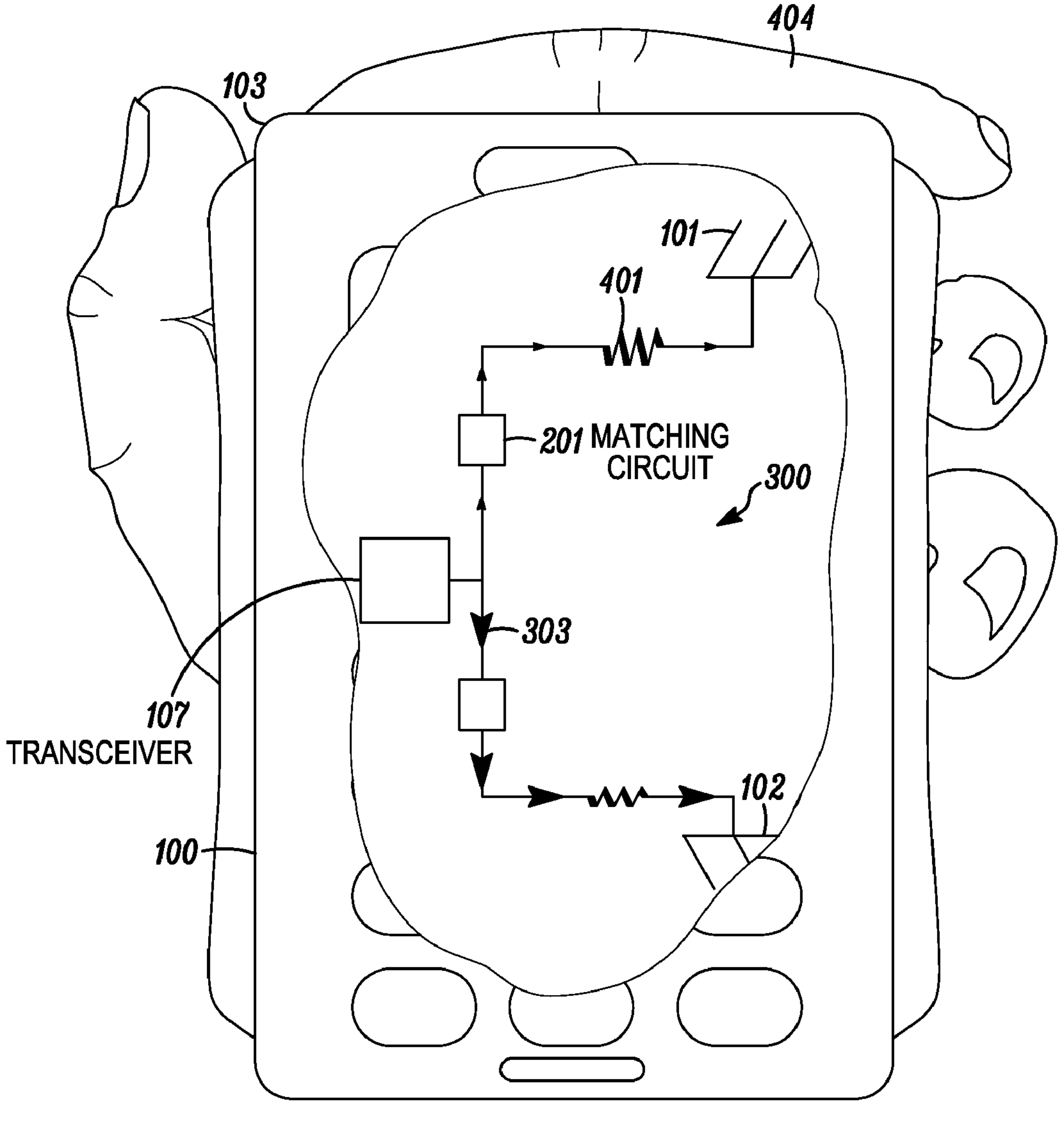
FIG. 6 provides a schematic representation of one embodiment of a portable two-way communication device having dual antennas, with a first antenna loaded and second antenna unloaded, in accordance with the invention.

Turning now to FIG. 6, illustrated therein is the dual autodiplexing antenna 300 with the first antenna 101 loaded. The first antenna 101 may become loaded where at least a hand 404 is adjacent to the first end 103 of the portable two-way communication device 100. The hand 404 causes the impedance associated with the first antenna 101 to become loaded. The loaded impedance 401 becomes worst case where the hand 404, possibly in conjunction with a head or head/hand combination, is adjacent to or proximately located with the first antenna 101. While loading of the first antenna 101 causes the corresponding return loss to increase, and the phase of the return loss is $2*\pi$ plus or minus $\pi/4$ radians. Expressed more generally, the phase of the return loss is $2*\pi*n$ plus or minus $\pi/4$ radians where n is an integer. This is where the corresponding real part of the resistance is substantially maximized. The insertion phase of the transmission line matching network serves to provide the return loss phase which meets this criterion.

Figure 10:
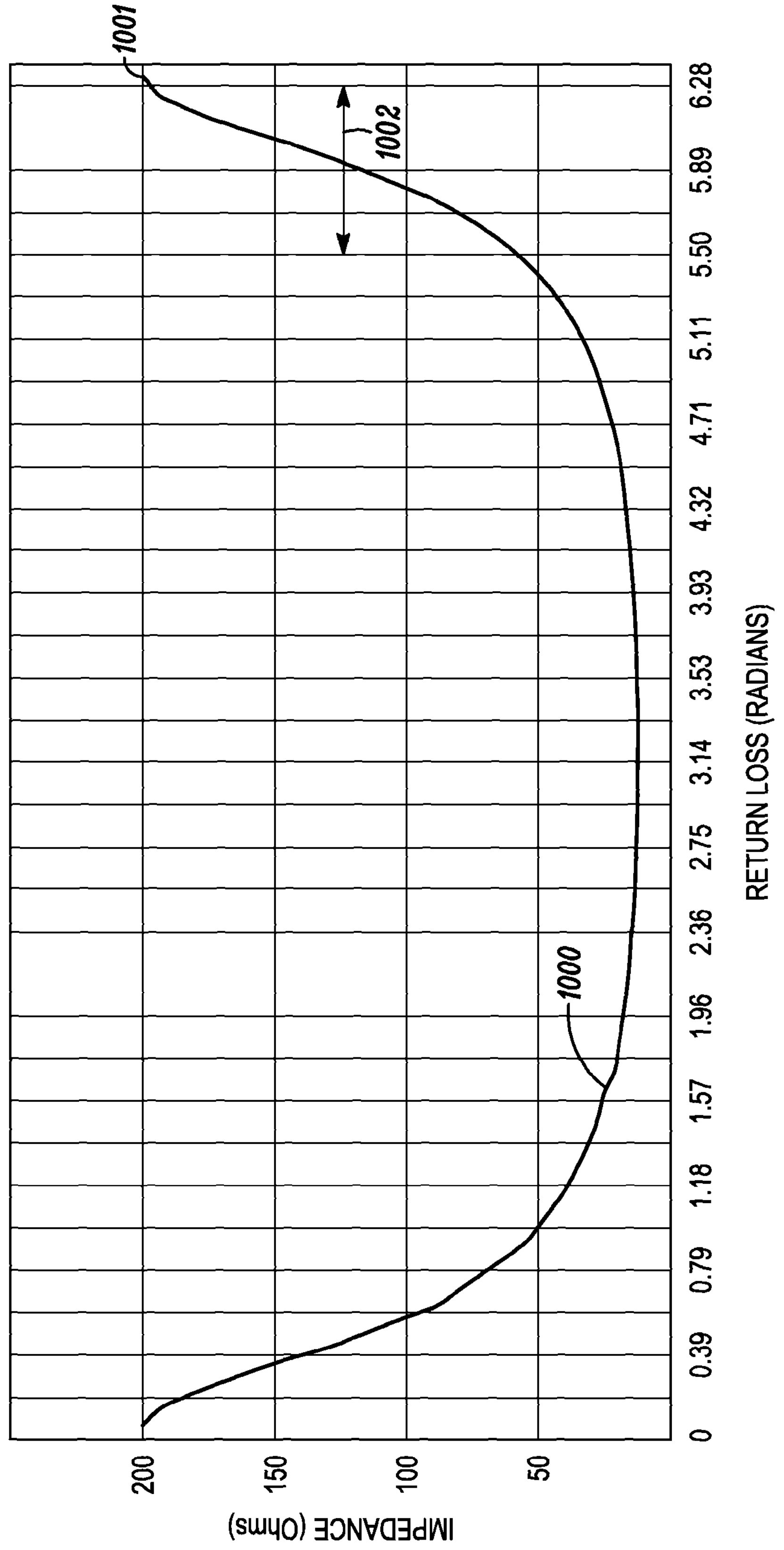
FIG. 10 illustrates the real part of the load impedance versus the phase of the return loss for a system in accordance with one embodiment of the invention.

Turning briefly to FIG. 10, illustrated therein is a plot of the real part of the load impedance versus the phase of the return loss for a system in accordance with one embodiment of the invention. This plot in FIG. 10 is for the case where VSWR is 4, and the output resistance of the transceiver (107) is 50 ohms. As shown by the curve 1000, the real part of the resistance is maximized at multiples of $2\pi$ radians, e.g. point 1001. The real part of the resistance is substantially maximized at multiples of $2\pi$ radians plus or minus $\pi/4$ radians, as illustrated by the impedance increase in region 1002.

As noted above, the insertion phase of the first transmission line matching circuit (201) is selected to increase or maximize the input impedance associated with the first antenna (101) when the first antenna (101) is in a worst case or fully loaded state. This causes the impedance of the first antenna (101), as seen by transceiver (107), to increase. This increase in impedance causes power flow to increase to the second antenna.

Figure 7B:
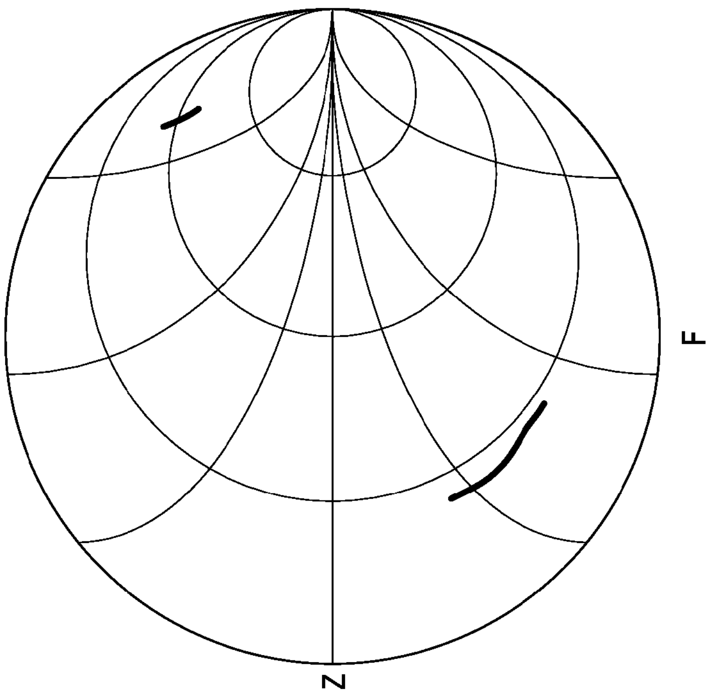
FIG. 7 illustrates an exemplary return loss and complex impedance plot for a loaded first antenna in accordance with one embodiment of the invention.
Figure 7A:
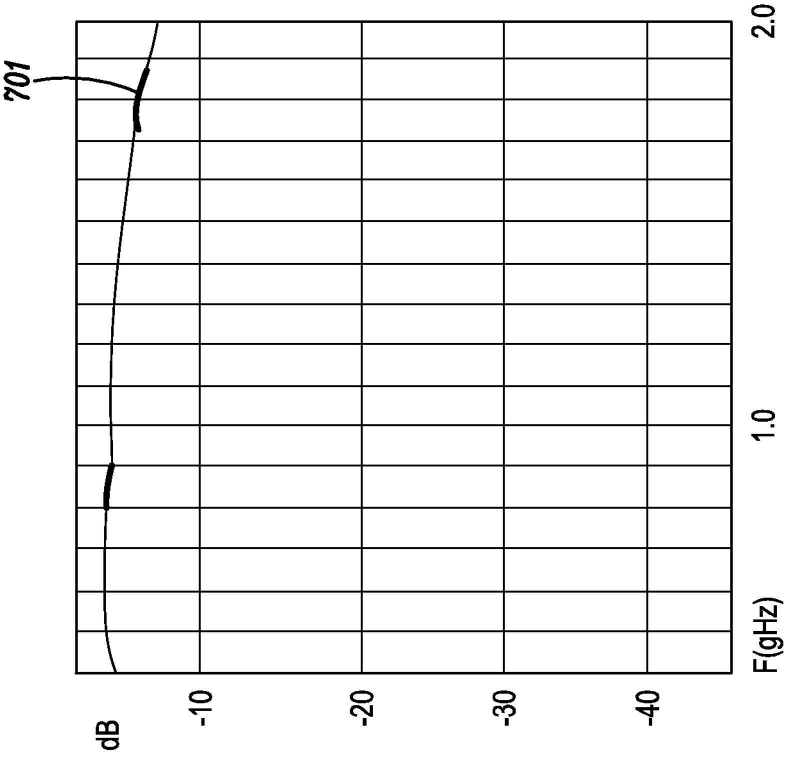

Turning briefly to FIG. 7, illustrated therein is the return loss and complex impedance of the first antenna (101) in a loaded state. As can be seen, the return loss in the high band at highlighted section 701 is much worse than that of the highlighted section (401) in FIG. 5. Thus, the ability of the first antenna (101) to transmit and receive signals is diminished due to the load.

Turning back to FIG. 6, viewing FIG. 6 as a transition from FIG. 3 due to the loading of the hand 404, to compensate for the first antenna 101 transitioning from an unloaded state to a loaded state, power flow 303 has been redirected from the first antenna 101 to the second antenna 102. This redirection is due to loaded impedance 401. Loaded impedance 401 occurs because the impedance of the first antenna 101 under load from the hand 404 is maximized due to the first transmission line matching circuit 201. As the second antenna 102 is capable of operating in both the high band and low band, the second antenna 102 provides the portable two-way communication device 100 with a mechanism to reliably continue transmitting even under loaded conditions.

Figure 8:
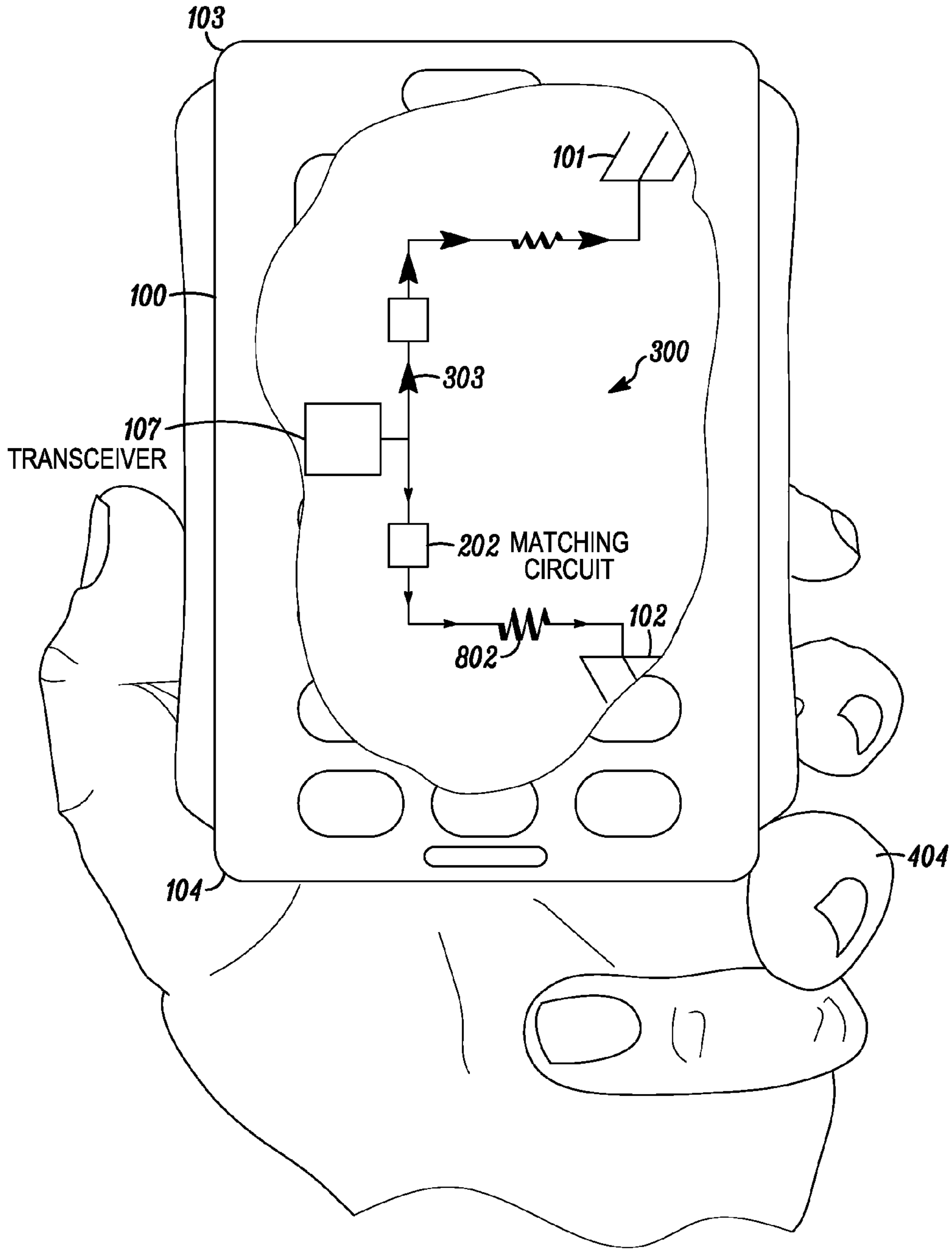
FIG. 8 provides a schematic representation of one embodiment of a portable two-way communication device having dual antennas, with a second antenna loaded and first antenna unloaded, in accordance with the invention.

The dual autodiplexing antenna may work the opposite way as well. Turning now to FIG. 8, illustrated therein is the dual autodiplexing antenna 300 where the second antenna 102 has been loaded with the hand 404 proximately located with the distal end 104 of the portable two-way communication device 100. In this scenario, impedance 802 is now fully loaded as an impedance associated with the second antenna 102 is maximized. As the second transmission line matching circuit is selected to maximize the impedance, power flow 303 is redirected from the second antenna 102 to the first antenna 101. The dual antenna structure, working in conjunction with the first transmission line matching circuit 201 and second transmission line matching circuit 202, has diplexed power to the lesser loaded antenna.

While the dual autodiplexing antenna 300 directs power to the lesser loaded antenna, as noted above, in the exemplary embodiment of mobile telephones a common worst case loading scenario occurs when a user is holding the first end 103 of the portable two-way communication device 100, as both hand and head are proximally located with the first end 103. For this reason, in one embodiment, the second antenna is selected to operate in both the upper band and lower band, such that the portable two-way communication device 100 will still be able to reliably communicate in this worst case condition.

Figure 9B:
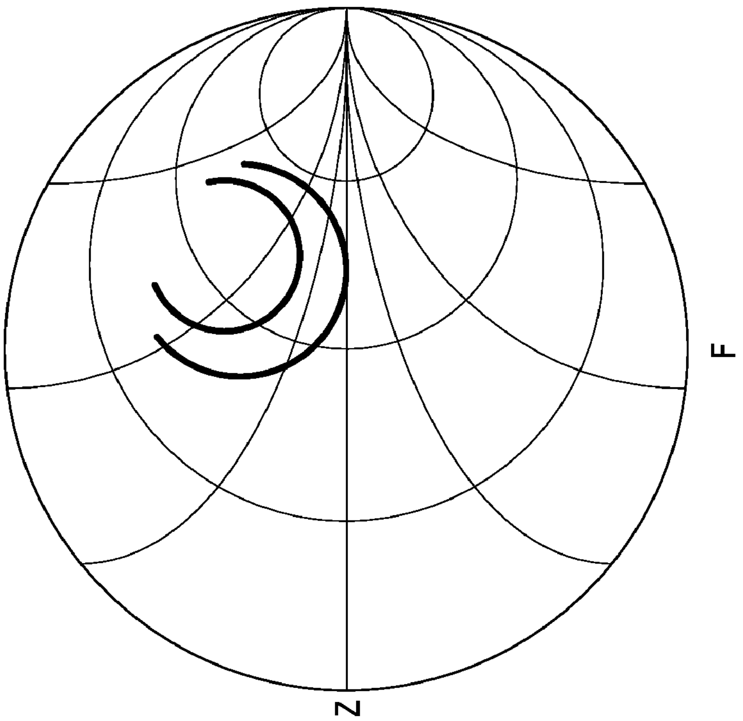
FIG. 9 illustrates an exemplary combined performance of a dual autodiplexing antenna at a worst case loaded condition in accordance with one embodiment of the invention.
Figure 9A:
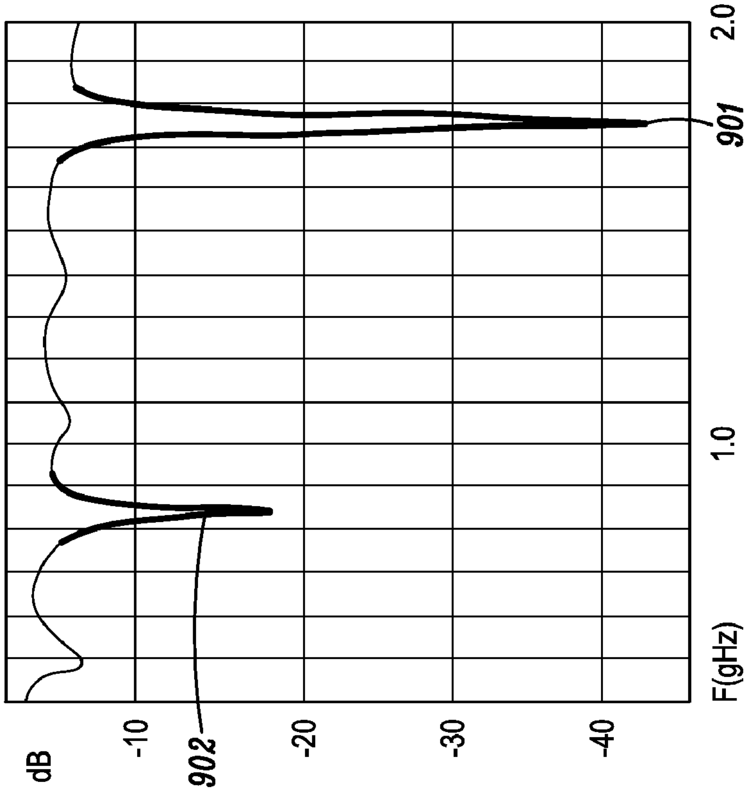

Turning now to FIG. 9, illustrated therein is a simulated return loss and complex impedance of a dual autodiplexing antenna (300) structure in accordance with the invention. The return loss and complex impedance are under worst case loading. For this simulation, the following wave guide parameters were used: For the first transmission line matching circuit (201), a waveguide having a length of 118 mm, a thickness of 12 mils, and a spacing of 100 micrometers from the ground plane was used. For the second transmission line matching circuit (202), a wave guide having a length of 35 mm, a thickness of 12 mils, and a spacing of 100 micrometers from the ground plane was used. Antenna models having geometries similar to those of FIG. 2 were used. The results are shown in FIG. 9.

As can be seen in FIG. 9, under worst case loading, the dual autodiplexing antenna (300) of the present invention improves both performance in the high band, represented by highlighted segment 901, and performance in the low band, represented by highlighted segment 902. This improvement is due to the diplexing feature of directing power transmission from the transceiver (107) to the lesser loaded antenna as a function of the placement of the user's hands about the device.

The use of two antennas, with one located at the top rear of the device and another located at the bottom rear of the device, combined with the use of selected transmission line matching circuits, serves to diplex energy from a loaded antenna to an unloaded antenna. The top antenna is generally operational in a first bandwidth, while the second antenna is generally operational in a second bandwidth, but the second antenna is functionally able to operate in the first and second bandwidths. Power flow redirection under loading is accomplished by providing the insertion phase of the transmission line matching circuits such that a worst case antenna impedance rotates to a high impedance at the transmission line matching circuit interface.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. An electronic device, comprising:

a. a transceiver;

b. a first transmission line coupled to the transceiver;

c. a first antenna characterized for operation in at least a first bandwidth coupled to the first transmission line, the first antenna having at least a first impedance in an unloaded state and a second impedance in a loaded state;

d. a second transmission line coupled to the transceiver; and e. a second antenna characterized for operation at least in a second bandwidth coupled to the second transmission line;

wherein when the first antenna transitions from the unloaded state to the loaded state, power to the second antenna increases.

2. The electronic device of claim 1, wherein the first antenna is in a fully loaded state when an impedance associated with the first antenna is maximized.

3. The electronic device of claim 2, wherein the first antenna is in the fully loaded state when one of a hand, head, and combinations thereof is proximally located with the first antenna.

4. The electronic device of claim 1, wherein an insertion phase of the first transmission line is selected to maximize an input impedance associated with the first transmission line when the first is in a fully loaded state.

5. The electronic device of claim 1, where an insertion phase of the first transmission line is selected such that a return loss phase of the first antenna is within a multiple of $2\pi$ radians plus or minus $\pi/4$ radians when the first transmission line is in a fully loaded state.

6. The electronic device of claim 1, wherein an insertion phase of the first transmission line is selected to minimize a reactive component of power delivered from the transceiver when the first transmission line is in a fully loaded state.

* * * * *